United States Patent
Donazzi et al.

(10) Patent No.: US 7,365,269 B2
(45) Date of Patent: Apr. 29, 2008

(54) METHOD OF SCREENING THE MAGNETIC FIELD GENERATED BY AN ELECTRICAL POWER TRANSMISSION LINE AND ELECTRICAL POWER TRANSMISSION LINE SO SCREENED

(75) Inventors: Fabrizio Donazzi, Milan (IT); Enrico Borghi, Cogliate (IT); Paolo Maioli, Crema (IT); Sergio Spreafico, Erba (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/530,520

(22) PCT Filed: Oct. 9, 2002

(86) PCT No.: PCT/EP02/11302

§ 371 (c)(1),
(2), (4) Date: Oct. 26, 2005

(87) PCT Pub. No.: WO2004/034539

PCT Pub. Date: Apr. 22, 2004

(65) Prior Publication Data

US 2006/0104010 A1    May 18, 2006

(51) Int. Cl.
    *H01R 4/00* (2006.01)
(52) U.S. Cl. ..................... 174/84 R; 174/92
(58) Field of Classification Search ............... 174/36, 174/110 R, 113 R, 113 C, 110 A–110 FC, 174/120 R, 102 R, 108, 74 R, 84 R, 91, 174/92, 93
See application file for complete search history.

(56) References Cited

U.S. PATENT DOCUMENTS 2,787,651 A * 4/1957 Lapsley .................. 174/32
3,160,702 A * 12/1964 Lapsley .................. 174/32
3,594,492 A * 7/1971 Bahder et al. ............. 174/36
4,639,544 A * 1/1987 Dableh et al. ............. 174/32
5,389,736 A * 2/1995 Ziemek et al. ............. 174/36
6,806,418 B2 * 10/2004 Donazzi et al. ............ 174/36

FOREIGN PATENT DOCUMENTS

| DE | 27 10 620 A1 | 9/1978 |
| DE | 2710620 A1 * | 9/1978 |
| DE | 3447836 A1 * | 12/1984 |
| DE | 34 06 664 A1 | 9/1985 |
| DE | 34 47 836 A1 | 7/1986 |
| EP | 0 525 600 A2 | 2/1993 |
| EP | 0 870 848 A1 | 10/1998 |
| EP | 1 148 605 A1 | 10/2001 |
| FR | 2.164.067 | 7/1973 |
| WO | WO 99/64367 | 12/1999 |

OTHER PUBLICATIONS

Argaut, et al., "Shielding Technique to Reduce Magnetic Fields from Buried Cables", JICABLE, pp. 331-338, (1999).
Bucea, et al., "Shielding Techniques to Reduce Magnetic Fields Associated with Underground Power Cables, Case Study From Sydney Australia", Database accession No. 6650799 XP000949312, CIGRE, vol. 6, 6 pages, (1998).

* cited by examiner

*Primary Examiner*—William H. Mayo, III
(74) *Attorney, Agent, or Firm*—Finnegan, Henderson, Farabow, Garrett & Dunner, L.L.P.

(57) ABSTRACT

An electrical power transmission line having at least one electrical cable, a conduit of ferromagnetic material enclosing the electrical cable and having a base and a cover and electrical contact elements for electrically connecting the base and the cover, wherein the electrical contact elements are metal fusion joints or metal resilient members suitable to pierce the ferromagnetic material.

31 Claims, 6 Drawing Sheets

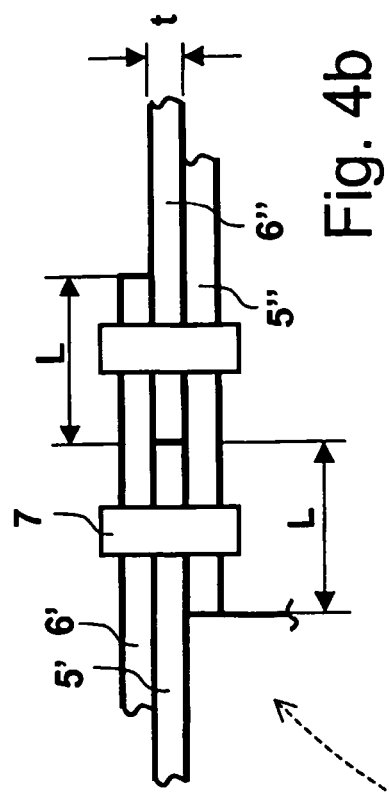
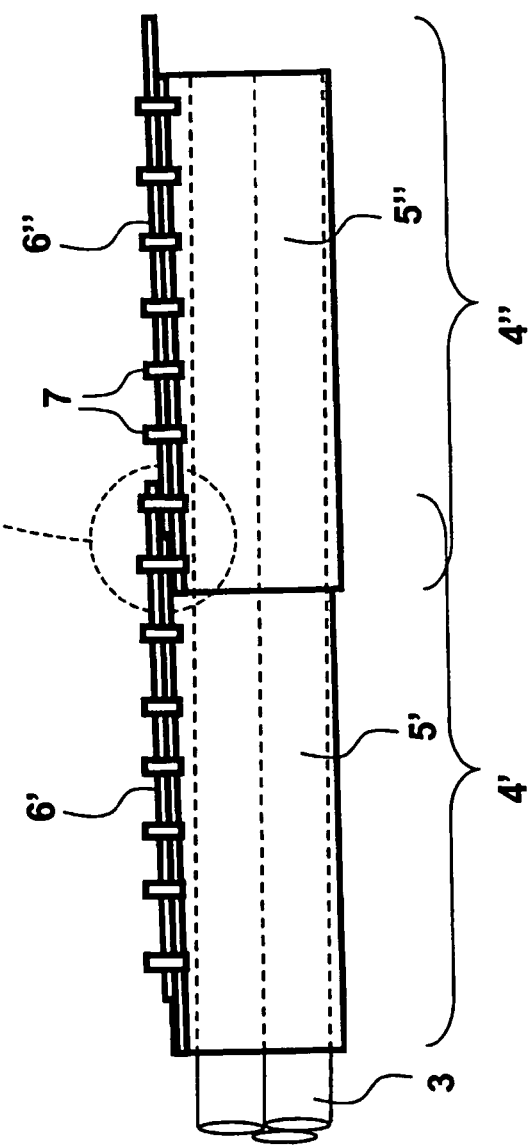

METHOD OF SCREENING THE MAGNETIC FIELD GENERATED BY AN ELECTRICAL POWER TRANSMISSION LINE AND ELECTRICAL POWER TRANSMISSION LINE SO SCREENED

CROSS REFERENCE TO RELATED APPLICATION

This application is a national phase application based on PCT/EP2002/011302, filed Oct. 9, 2002, the content of which is incorporated herein by reference.

BACKGROUND OF THE INVENTION

1. Field of the Invention

The present invention relates to a method for screening the magnetic field generated by an electrical power transmission line and to an electrical power transmission line so screened.

2. Description of the Related Art

Generally, a high-power electrical transmission line is designed to operate at medium voltages (typically from 10 to 60 kV) and high voltages (typically higher than 60 kV), and currents of the order of hundreds of amperes (typically from 500 to 2000 A). The electrical power carried in these lines can reach values of the order of hundreds of MVA, typically 400 MVA. Normally, the current carried is an alternating current at low frequency, in other words generally below 400 Hz, and typically at 50-60 Hz. In general, these lines are used for transferring power from electrical power stations to urban centres, over distances of the order of tens of km (normally 10-100 km).

Typically, electrical power transmission lines are three-phase lines comprising three cables buried in a trench at a depth of 1-1.5 m. In the space immediately surrounding the cables, the magnetic field H can reach relatively high values and, at ground level (i.e. at 1-1.5 m distance from the line), a magnetic induction as high as 20-60 μT (depending on the geometrical arrangement of the cables with respect to each other) can be measured.

To avoid possible biological effects due to exposure to magnetic fields of this size generated by low-frequency (50 Hz) sources, a "safety threshold" is considered, below which the probability of biological damage can be reduced to a minimum, if not eliminated. A threshold of magnetic induction on which some national legislation is tending to become harmonized, is 0.2 μT, a value which is approximately 100 times smaller than that generated by an unshielded three phase line as indicated above.

As it is known, placing the power cables into shielding conduits can mitigate the magnetic field generated thereby.

The article by P. Argaut, J. Y. Daurelle, F. Protat, K. Savina and C. A. Wallaert, "Shielding technique to reduce magnetic fields from buried cables", A 10.5, JICABLE 1999, considers and compares the shielding effect provided by an open-section screen, such as a sheet of ferromagnetic material, placed above the cables, and a closed-section screen, such as a conduit of rectangular section made of ferromagnetic material, placed around the cables. According to this article, attenuation factors of approximately 5-7 can be obtained with open-section screens, attenuation factors of approximately 15-20 can be obtained with closed-section screens and attenuation factors of approximately 30-50 can be obtained when the closed-section screen is formed very close to the cables (for example from a sheet of ferromagnetic material wound directly around the three cables).

Although close conduits are reported above to provide the best shielding effects, the Applicant has noticed that cable installation into close ducts is a difficult and costly operation, due in particular to the high pulling forces required, and has considered the use of two-pieces conduits, in particular conduits comprising a base and a cover, for facilitating the installation procedure. With a two-pieces conduit, after positioning the base into the trench, the cables are laid down into the base and the cover is finally leaned onto the base to substantially close the conduit. Two-pieces conduits thus allow greater laying lengths, in particular in tortuous paths, where cable pulling inside closed (single-piece) conduits would be very difficult. Moreover, two-pieces conduits allow cable inspection during and after the lay-down.

However, the Applicant has observed that a two-pieces conduit typically has an air gap at the interface between base and cover, due to unavoidable unevenness and undulations of the contact surfaces, and has verified that the presence of such an air gap may dramatically affect the magnetic shielding properties of the conduit. For example, the Applicant has verified, with a numeric simulation, that a cylindrical shielding conduit having a 1 cm-wide longitudinal air gap determines the presence, at a distance of 2.4 m, of a magnetic field that is approximately six times that measured when a completely closed conduit is used. The Applicant attributes that worsening to the break in the electric and magnetic continuity of the shield that is caused by the high electrical resistivity and high magnetic reluctance of the air gap. In other words, the shield locally looses its magnetic confining ability and is subjected to significant leakage of magnetic field lines.

The Applicant has observed that in the practice the presence of such gap cannot be avoided, not only because of the imperfect planarity of the facing surfaces of the base and cover, but also because of the presence of oxide, sand, dirt, loose material which are typically present during the installation activity in the field, which may prevent or limit the close contact between base and cover.

The Applicant has tackled the problem of improving the magnetic shielding properties of a two-pieces conduit, which is, as previously stated, a convenient solution as concern installation.

SUMMARY OF THE INVENTION

The Applicant has found that the magnetic shielding properties of a two-pieces conduit can be controlled by providing a suitable magnetic continuity between base and cover.

In particular, such magnetic continuity can be obtained by providing an electrical coupling between base and cover having a predetermined high conductance, suitable to allow a high conductive path between base and cover to be created.

The Applicant has found that the magnetic continuity of a two-pieces conduit can be improved by providing a mechanical and electrical coupling between base and cover and has observed that different coupling solutions may provide very different results in improving the electric and magnetic continuity of the shield, both in terms of a reduction of the air gap and of creation of a conductive path between base and cover.

In particular, the Applicant has observed that when an electrical connection is defined through a flat surface contact, this electrical connection may become defective due to corrosion effects and dust and dirt accumulation at the coupling interface.

The Applicant has found that, by coupling cover and base of a two-pieces conduit by means of an elastic coupling with material interpenetration, or by means of a local metal fusion, it is possible to obtain the electromagnetic continuity that is required to efficiently shield the cables with an effectiveness comparable with that of completely closed shields.

For the purposes of the present invention, with "material interpenetration" it is intended the condition achieved when one body undergoes a plastic deformation so as to receive, within its boundaries, material of another body.

Moreover, for the purposes of the present invention, with "local metal fusion" it is intended the metal fusion obtained by welding (wherein the bond joining the two pieces is metallurgical and requires considerable diffusion, preferably with the addition of material to help the weld), brazing (wherein the braze metal melts, but the parts being joined may not, so that the bond is typically formed by limited solid-state diffusion of braze metal into the joined parts), soldering (wherein neither melting nor solid-state diffusion of the joined surfaces takes place, the bond being usually determined by the adhesion of melted solder to each metal surface), or similar (such as braze-welding, which is a method of welding in which coalescence is produced by heating above 427° C. and by using a nonferrous filler having a melting point below that of the base metals; in distinction to brazing, capillary attraction does not distribute the filler metal in the joint).

Elastic coupling with material interpenetration can for example be obtained by using joining members provided with sharp protruding parts, such as resilient clips having penetrating teeth, to be applied on superimposed portions of base and cover. The sharp protruding parts, besides defining the electrical contacting points, advantageously carry out a localized cleaning action on the coupling surface during the application of the joining member, by removing any oxide, dirt, sand, or loose material present on that points of the surface.

Elastic coupling with material interpenetration, such as the coupling by clips, is very simple and quick to do and, differently from metal fusion joining, does not require local power supplying (which may not be available in the laydown place).

In a first aspect, the present invention relates to an electrical power transmission line, comprising:
at least one electrical cable;
a conduit of ferromagnetic material enclosing said at least one cable and comprising a base and a cover; and
electrical contact elements electrically connecting said base and said cover, wherein said electrical contact elements are selected from the group consisting of metal fusion joints and resilient members suitable to penetrate said ferromagnetic material.

The conduit may be placed underground.

Preferably, the electrical power transmission line comprises three cables arranged in a trefoil configuration.

Base and cover advantageously have superimposed portions on both sides of the conduit, and the electrical contact elements are preferably applied to said superimposed portions. The superimposed portions may be separated by an air gap and preferably have a width that is at least five times greater than the thickness of said gap. The gap is preferably at most 3% of the perimeter of the cross section of said conduit. A material having a magnetic permeability greater than air may be positioned between the superimposed portions of base and cover.

The electrical contact elements have a reciprocal longitudinal distance that is preferably at most 50 cm, more preferably at most 25 cm. According to one embodiment, the electrical contact elements may be resilient clips provided with portions able to penetrate said ferromagnetic material by causing a plastic deformation thereof.

The conduit advantageously comprises a plurality of longitudinal sections partially superimposed on each other and each comprising a base portion and a cover portion. The base portion preferably has a substantially "U"-shaped cross-section and the cover portion is preferably substantially flat.

Advantageously, the longitudinal sections are electrically coupled to each other. For example, the longitudinal sections may be superimposed of a length that is preferably at least 25% of the width of said conduit. The cover and base portions of each of said longitudinal sections may be longitudinally shifted from each other. At least two of said longitudinal sections may extend along different directions, and the conduit may comprise a joining member for joining said two conduit sections, said joining member consisting of two parts electrically connected by means of said electrical contact elements.

In a second aspect thereof, the present invention relates to a method for screening the magnetic field generated by an electrical power transmission line comprising at least one electrical cable, comprising the steps of:
placing said electrical cable in a conduit of ferromagnetic material comprising a base and a cover; and
providing an electrical connection between said base and said cover having a conductance, per meter of length, of at least 150 Siemens/m, preferably of at least 500 Siemens/m, more preferably of at least 1500 Siemens/m.

Preferably, said electrical connection is made by local metal fusion (e.g. welding, soldering, brazing) or by elastic coupling with material interpenetration.

Preferably, placing said at least an electrical cable in a conduit comprises superimposing respective lateral portions of said base and said cover, and electrically coupling said base and said cover comprises electrically coupling said lateral portions.

Electrically coupling said lateral portions may comprise applying to said lateral portions a plurality of metal resilient clips able to pierce the surface of said lateral portions under their elastic action.

Placing said at least an electrical cable in an conduit preferably comprises arranging the base underground, laying down said at least an electrical cable into said base, and leaning the cover onto said base so as to substantially close said conduit.

Advantageously, the conduit comprises a plurality of longitudinal sections and the method further comprises electrically coupling said longitudinal sections.

BRIEF DESCRIPTION OF THE DRAWINGS

Further characteristics and advantages will be more evident in the light of the detailed description of some examples of the present invention. This description, provided below, relates to the attached drawings provided solely by way of example and without restrictive intent, in which:

FIG. 4a is a side view of the electrical power transmission line of FIG. 1, and FIG. 4b is an enlarged view of the particular encircled by a dotted line in FIG. 4a;

DETAILED DESCRIPTION OF THE INVENTION

Figure 1:
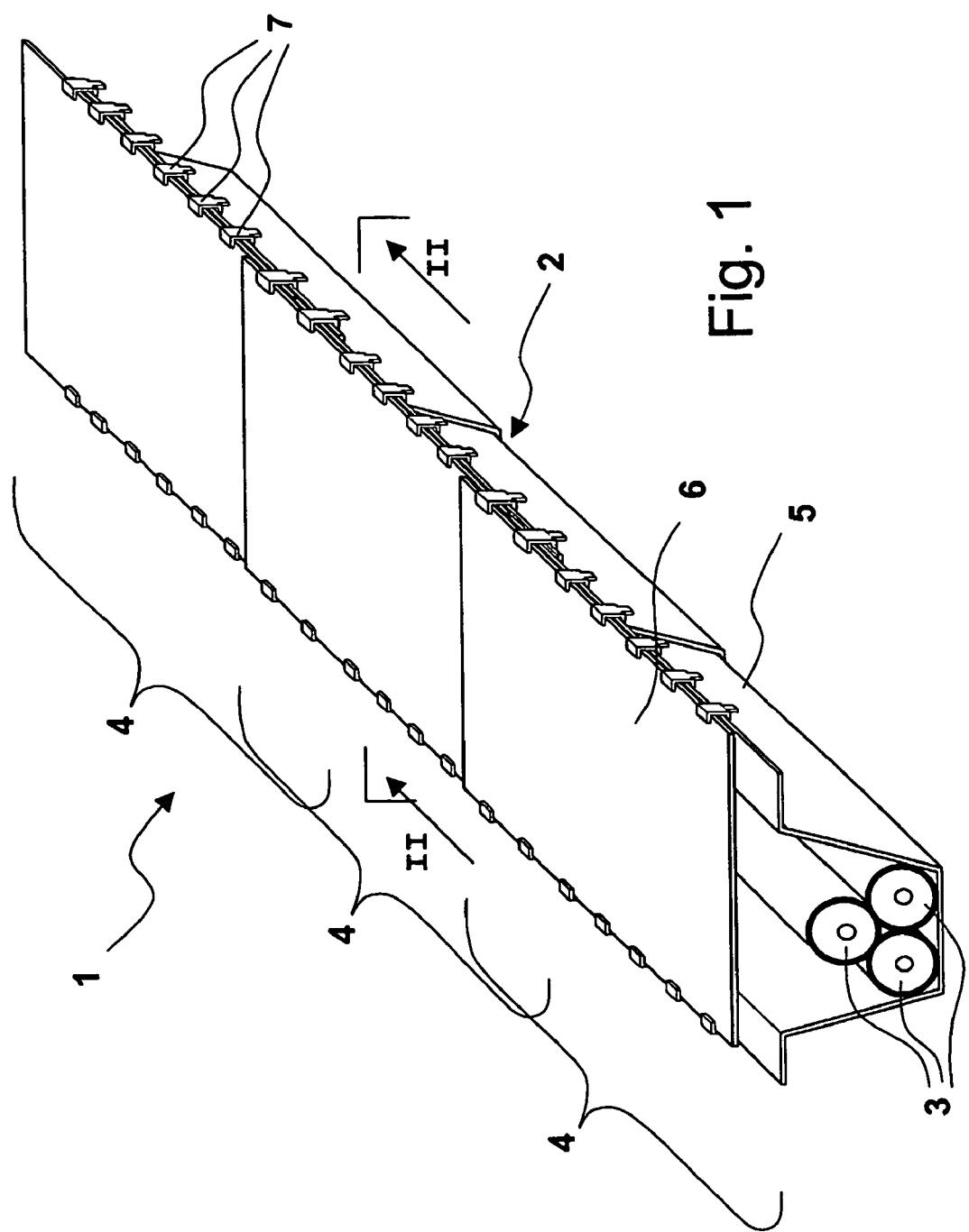
FIG. 1 shows part of an electrical power transmission line according to the present invention.
Figure 2A:
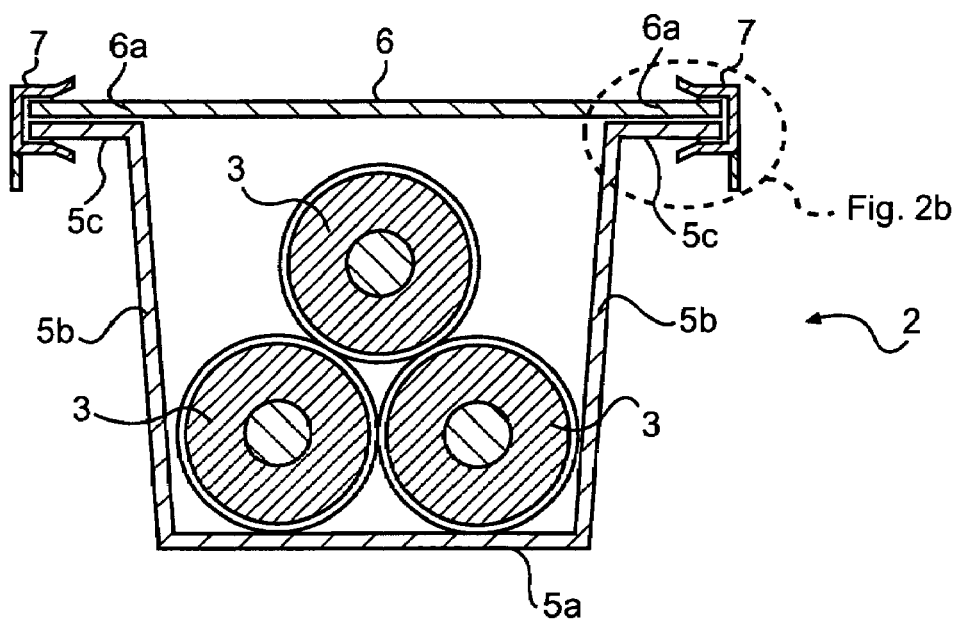
FIG. 2a is a cross section according to plane II-II of the electrical power transmission line of FIG. 1.

With reference to FIGS. 1 and 2a, an electrical line 1, suitable for three-phase transmission at medium or high power, comprises a conduit 2 made of ferromagnetic material and three cables 3 extending inside the conduit 2. Cables 3 are suitable to carry an alternating current at a frequency typically comprised between 50 and 60 Hz and are arranged in contact with each other in a trefoil configuration (in other words with their geometrical centres positioned as the vertices of a substantially equilateral triangle). Cables 3 may alternatively lie aligned on the bottom of the conduit 2, although this solution may require a wider conduit and may increase the magnetic field around the cables.

Electrical line 1 is for example a high power line suitable to operate at a voltage of about 132 kV and a current of about 400 A, and able to carry currents up to 860 A. Electrical line 1 is particularly intended for underground application, although its shielding properties make it suitable also for use above-ground.

Each of the cables 3 may comprise, for example, an enamelled copper Milliken conductor, insulated with an extruded polymer insulation, for example of cross-linked polyethylene (XLPE) type. The Milliken conductor may have, for example, a cross section of 1600 mm$^2$. The outer surface of each cable may also be provided with a metal sheath for protection from moisture. The total external diameter of each cable is typically of 100 mm.

Cables 3 may be tied in the trefoil configuration by means of fasteners or the like. Alternatively, with a proper selection of the dimensions of the conduit 2, one or more wedge members, preferably of wood, may be placed between the cables 3 and the internal walls of the conduit 2, at suitable distances, to keep the cables 3 in the trefoil configuration along the line.

Moreover, the trefoil of cables 3 may be in direct contact with the bottom of the conduit 2 or may be raised with respect to it, in a position that is closer to the geometrical centre of the cross-section of the conduit 2. To raise the trefoil of cables 3, shim members (not shown) may be provided between the conduit 2 and the cables 3.

The space inside the conduit 2 that is not occupied by the trefoil of cables 3 can be left in its air-filled state or may be filled with a material having low thermal resistivity, such as an inert filler as described in the international patent application WO9964367A1 of the same Applicant.

Conduit 2 is a modular conduit comprising a plurality of longitudinal sections 4 (only three of which are shown in FIG. 1), having a typical length of a few meters, joined end to end to form an extended raceway.

The length of each section is selected according to practical considerations, such as the weight of the section and the method of laying down the conduit. For example, in case the laying operation is to be made manually, the length of each section should be such to provide a weight which can be easily handled by the involved personnel. In other cases, for instance if mechanical laying operation is contemplated, different selection criteria may be applied.

Each section 4 comprises two separate members, in particular a base 5 and a cover 6, which are superimposed and coupled to each other to define a substantially closed tubular duct. Preferably, sections 4 have the same length and each cover 6 has the same length and width of the corresponding base 5. Moreover, bases 5 and covers 6 have preferably a same thickness, which is preferably of at most 10, more preferably of at most 5 mm, still more preferably of at most 3 mm.

As better observable from the cross sectional view of FIG. 2a, base 5 may have a substantially U-shaped cross-section and cover 6 may have the shape of a flat rectangular slide. In greater detail, the base 5 may have a base wall 5a, two lateral walls 5b outwardly slanted from the base wall 5a, and two flanges 5c parallel to the base wall 5a and extending outwardly from the end portions of the lateral walls 5b to form respective "wings" of the base 5. Base 5 may be manufactured, for example, by folding a flat rectangular slide along four substantially parallel lines. In use, if excavation operations and installation of the conduit 2 are correctly performed, base wall 5a and flanges 5c should preferably lie horizontally.

Cover 6 is positioned with its lateral edges aligned with those of base 5, so that lateral portions 6a of cover 6 are superimposed to flanges 5c. Two superposition regions are thus defined, on both sides of the conduit 2, having a width corresponding substantially to the lateral dimensions of flanges 5c. Said width is preferably comprised between 10 and 150 mm. To improve the magnetic field confinement properties of conduit 2, the ratio between the width of the superposition region and the possible air gap between flange 5c and lateral portion 6, indicated respectively with w and g in FIG. 2b, should preferably be greater than 5. Moreover, the total air gap in the conduit cross-section, which is twice the gap g on each side of the conduit, is preferably lower than 3%, more preferably lower than 1%, of the conduit cross-section perimeter (non including the wings 5c and the facing portions 6a of the cover), to allow magnetic circulation.

Figure 2B:
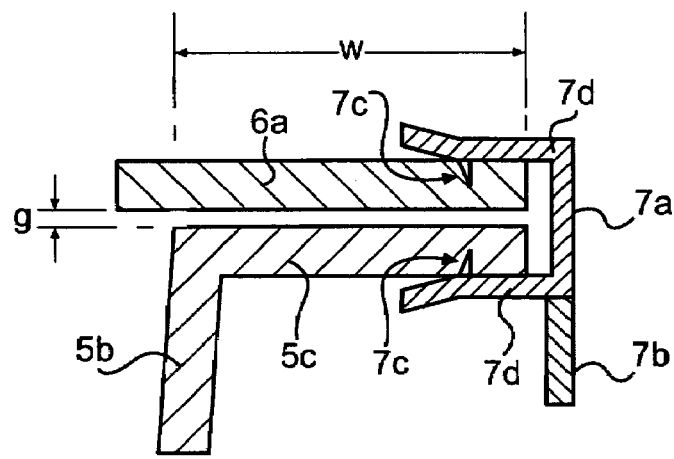
FIG. 2b is an enlarged view of the particular encircled by a dotted line in FIG. 2a, and FIG. 2c is an alternative embodiment of the particular of FIG. 2b.
Figure 2C:
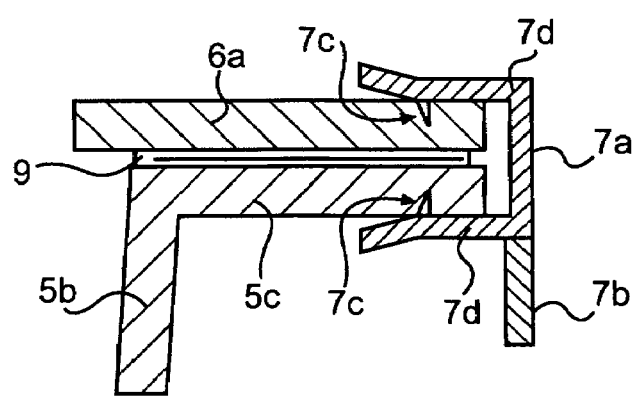

As shown in the alternative embodiment of FIG. 2c, the gap between base 5 and cover 6 may be (at least partially) filled with a material 9 having a magnetic permeability greater than air. For example, a packing member 9 of magnetic rubber may be interposed between base 5 and cover 6 on each side of the conduit 2. Alternatively, a rigid packing member made of steel or other material with high magnetic permeability can be used. As a further alternative, it can be used a resin or a glue filled with a material having high magnetic permeability, such as iron powder. By increasing the magnetic permeability between base 5 and cover 6, the magnetic continuity of the conduit 2 is improved. Advantageously, the material of the packing member 9 may be chosen having a low electrical resistivity, so as to improve the electrical connection between base 5 and cover 6. Alternatively, it is possible to use a material having high electrical conductivity and low magnetic permeability, such as copper. Any residual air gap between base 5 and cover 6, not filled by the packing member 9, should preferably have the maximum dimensions previously stated.

If the space inside the conduit 2 (not occupied by the trefoil of cables 3) contains a filler, such as a concrete composition, care must be taken to avoid such concrete or the like to lie on the flanges 5c before cover 6 is leaned onto base 5, during installation of the transmission line.

Both base 5 and cover 6 are preferably made of a same ferromagnetic material, preferably steel. The relative magnetic permeability $\mu_{max}$ of the material is preferably greater than 1000, more preferably greater than 4000, still more preferably greater than 8000, and the electrical conductivity is preferably greater than $10^6$ Siemens/m. Base 5 and cover 6 may also be made of two different ferromagnetic materials, preferably two different types of steel, each having the above-mentioned magnetic and electrical properties.

The surface of both base 5 and cover 6 is preferably treated by galvanization and tarring. In Table 1 are reported the composition and the electric and magnetic properties of two different types of steel that can be used to manufacture conduit 2, here identified as "B" and "Q".

TABLE 1

| Name | "B" | "Q" |
|---|---|---|
| Type | Fe 510 | ULC (Ultra-Low Carbon) |
| Elements | | |
| Iron | 97.910 | 99.668 |
| Carbon | 0.180 | 0.010 |
| Manganese | 1.460 | 0.190 |
| Silicon | 0.270 | 0.030 |
| Sulphur | 0.018 | 0.011 |
| Phosphorus | 0.015 | 0.005 |
| Chromium | 0.050 | 0.013 |
| Nickel | 0.030 | 0.025 |
| Molibdeno | 0.020 | 0.005 |
| Aluminum | 0.027 | 0.027 |
| Copper | 0.020 | 0.016 |
| Electric/magnetic properties | | |
| $\rho$ [$\Omega \cdot$ m] | 2.16E−07 | 1.17E−07 |
| $\mu_{max}$ | 482 | 4900 |
| $H_{\mu max}$ [As/m] | 1350 | 145 |

In Table 1, $\rho$ is the electrical resistivity, $\mu_{max}$ the maximum value of the relative magnetic permeability and $H_{\mu max}$ the magnetic field strength at $\mu_{max}$.

Due at least to the higher value of $\mu_{max}$, steel Q is preferable with respect to steel B. In fact, by choosing a material with a higher value of $\mu_{max}$, it is possible to obtain comparable shielding properties with a conduit of lower thickness and, therefore, of lower weight. Having a conduit of reduced weight is important to reduce installation costs, in that the conduit can be laid-down manually by the installing people, instead of using complex machines. The Applicant has verified that the same shielding effect obtainable with a 3-4 mm-thick conduit made of steel Q could only be obtainable with a 5-8 mm-thick conduit made of steel B.

Other steels suitable for this application are for example described in the european patent application EP 870848 A1.

Figure 3:
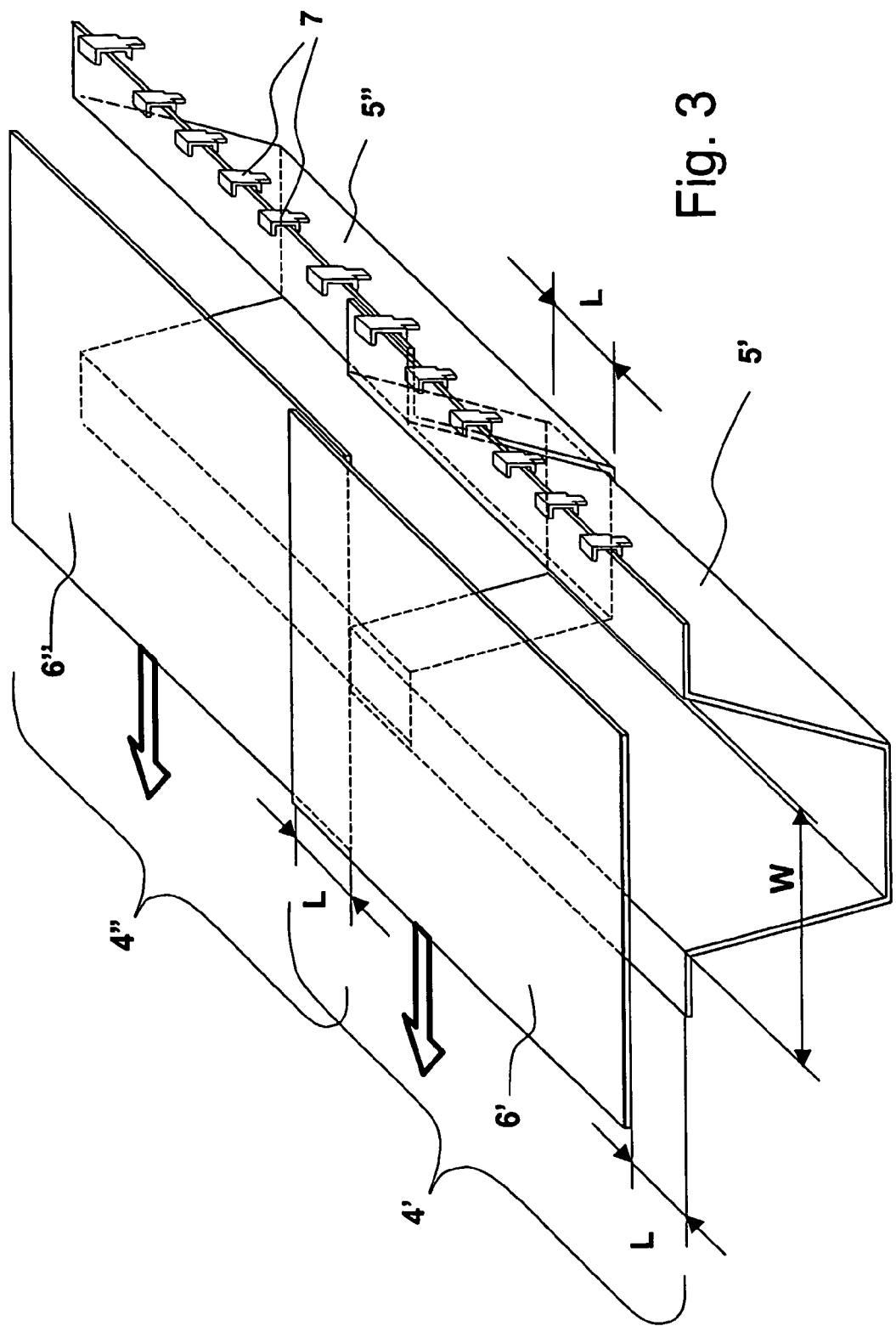
FIG. 3 is prospective view of a two-pieces conduit, which is part of the electrical power transmission line of FIG. 1, wherein the cover has been laterally shifted for explanatory purposes.

Preferably, contiguous sections 4 of conduit 2 are longitudinally superimposed, as shown in FIGS. 3, 4a and 4b, to avoid discontinuities in the magnetic shield. In particular, the bases 5', 5" of two consecutive sections 4', 4", are superimposed of a length L. Superposition between bases 5', 5" is made possible by the particular frusto-conical shape thereof. The corresponding covers 6', 6" are superimposed as well, preferably of a same length L. However, each cover 6 is advantageously shifted of a predetermined length with respect to the corresponding base 5, which shift length is preferably equal to the superposition length L. Accordingly, the cover 6' of a section 4' is positioned with its end against the end of the base 5" of the following section 4", as observable in FIG. 4b.

Superposition length L is preferably greater than one quarter of the maximum internal width W of conduit 2 (L>¼·W), more preferably greater than one half of that width (L>½·W), still more preferably greater than three quarters of that width (L>¾·W). In any case, the superposition length L is preferably comprised between 10 and 300 mm.

Base 5 and cover 6 are advantageously coupled to each other to increase the electric and magnetic continuity at the interface thereof and, therefore, the magnetic shielding properties of the conduit 2. According to the present invention, coupling between base 5 and cover 6 is achieved by local metal fusion or by elastic coupling with material interpenetration. Accordingly, the conduit 2 is provided with coupling means 7, which are either metal fusion joints or applied elastic members suitable to force material interpenetration. By providing the conduit 2 with coupling means 7 it is possible, besides fixing together the two pieces and reducing any possible gap at the interface, to create an electrical contact in between that guarantees a continuous flux of the magnetic field lines.

Other types of coupling, which cannot guarantee the same flux continuity, because of the presence of clearances, dust, dirty and/or corrosion, which prevent a correct electrical contact significantly reduce the magnetic screening capability of the conduit. For example, if bolts with flat washers are employed, the electric contact between the washers and the possibly dirty, oxide coated surface of the conduit may be poor.

In an embodiment, coupling means 7 are, as illustrated in FIGS. 2a and 2b, resilient clips of electrical conducting material, preferably steel. Clips 7 have a C-shaped resilient main body 7a, suitable to clamp and fasten together cover 6 and base 5 with an elastic force. Clips 7 are also provided with a handling flange 7b that helps in the fixing operation. The two opposite arms of the main body 7a, indicated with 7d, are provided with one or more teeth 7c directed inward the main body 7a, for superficially piercing the material of the base 5 and the cover 6 when the clip 7 is applied. The ends of arms 7d are advantageously bent outwards, to make application of clips 7 easier. Material penetration is important to guarantee coupling stability and to form a contact region that provides the required electromagnetic continuity between cover 6 and base 5. Moreover, by piercing the surface of base 5 and cover 6, clips 7 provide a more stable physical coupling between base 5 and cover 6.

Clips of the type herein above described are produced, for example, by ERICO Inc., 34600 Solon Road Solon, Ohio 44139 United States (model CADDY® H-Clips).

Clips 7 may be easily and quickly applied by means of a hammer: each clip 7 may be handled on flange 7b, positioned so that the ends of arms 7d face the side edges of cover 6 and base 5, and applied by a hammer stroke, thus causing penetration of teeth 7c into the material of cover 6 and base 5.

Clips 7 may advantageously be applied as equidistant couples, as shown in FIG. 1. As a general rule, the lower is the joint pitch and the more effective is the electromagnetic coupling between base 5 and cover 6. However, a compromise should be reached to avoid excessive costs. The Applicant has verified that a magnetic field shielding improvement greater than 30% (with respect to the condition of no coupling) is obtainable by longitudinally spacing the clips of 50 cm, and an improvement greater than 45% is obtainable by spacing the clips of 25 cm.

In the superposition regions between contiguous sections 4, as that shown in FIG. 4b, clips 7 shall clamp three overlapped pieces (5', 5", 6', or 5", 6', 6"), whose total thickness is three times the thickness t of a single piece.

As previously stated, metal fusion joint represents an alternative type of coupling means 7 suitable for the present scope. In particular, base 5 and cover 6 may be coupled with a continuous soldering, welding or brazing, extending for all, or almost all, the conduit length, or with a point-like soldering, welding or brazing. The distance between consecutive metal fusion points may be as that previously stated in the case of clips. Metal fusion joint has the advantage, with respect to clip joint, to form a more continuous and homogeneous electrical contact between the two bodies to be coupled, but has the drawback of being more subject to corrosion and of requiring longer time and power supplying for their installation.

Figure 5:
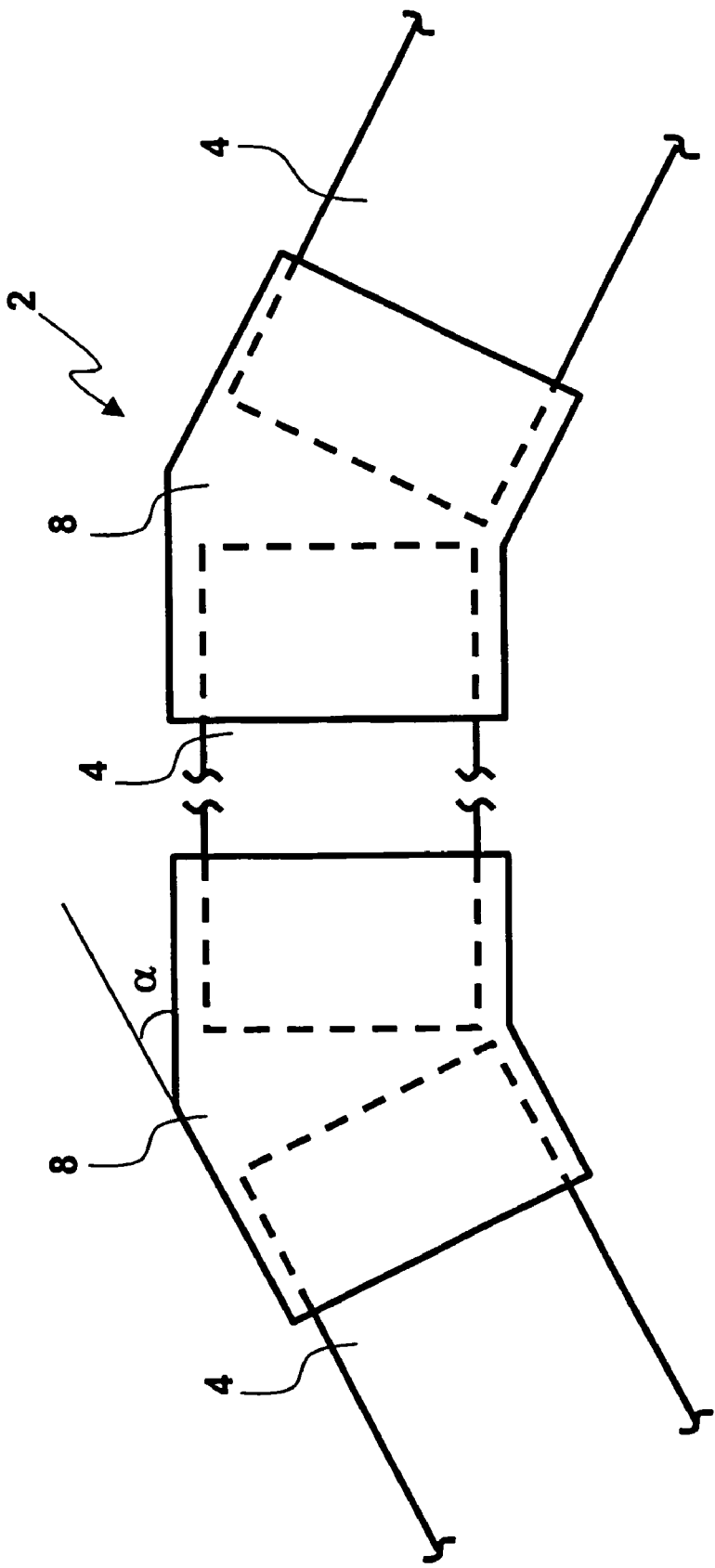
FIG. 5 illustrates a bent portion of an electrical power transmission line according to the present invention.

With reference to FIG. 5, conduit 2 may advantageously comprise bent or curved section-joining members 8 to allow horizontal or vertical variations of direction of the electrical transmission line 1. Joining member 8 is preferably a tubular member of the same material of base 5 and cover 6, having a portion bent or curved of an angle α, preferably comprised between 3° and 20°. Joining member 8 is preferably dimensioned so as to enclose the end of the two sections 4 to be joined. Alternatively, the joining member 8 may be dimensioned so as to fit the inside of sections 4.

Joining member 8 may comprise two separate parts superimposed on each other, having substantially the same cross-sectional shape and the substantially same dimensions of base 5 and cover 6; these two pieces will be identified as the base and cover of joining member 8.

Joining member 8 is superimposed to each of the two sections 4 to be joined of a length preferably comprised between 10 and 300 mm, while consecutive joining members 8 should preferably be spaced of not less than 1 meter, to avoid excessive stress on the cables 3 due to bending.

Base and cover of joining members 8 may advantageously be coupled by means of the same clips 7 used to couple base 5 and cover 6. In the superposition region between joining member 8 and section 4, the clips 7 have to couple together four pieces (base 5, cover 6, base and cover of joining member 8), having a total thickness of four times the thickness of a single piece.

The Applicant has verified that, to obtain a satisfactory magnetic continuity of the shield, coupling means 7 shall be selected and spaced to each other so as to provide an electrical connection between base 5 and cover 6 having an electrical conductance, per meter of length, of at least 150 Siemens/m, preferably of at least 500 Siemens/m, more preferably of at least 1500 Siemens/m. For example, elastic clips of the above-mentioned type, spaced with a pitch of 50 cm, are able to provide an electrical conductance, per meter of length, greater than 1500 Siemens/m. Of course, by reducing the pitch of the coupling means 7 it is possible to achieve a higher value of electrical conductance.

Base 5 and cover 6 may have different shapes from that previously described. For example, cover 6 may have a half-circle cross-section or a polygonal cross-section, such as triangular or trapezoidal; base 5 may have a half-circle cross-section or a polygonal cross-section, such as trapezoidal; flanges 5c may lie on different planes; the trefoil of cables 3 may be upset, with one cable below and two above, and the lateral walls 5b of base 5 so slanted as to fit such arrangement. Joining members 8, when required, should be shaped accordingly.

Moreover, base 5, cover 6 and joining members 8, instead of being completely made of ferromagnetic material, could comprise layers of different materials, at least one of which is of ferromagnetic material.

As concerns coupling between contiguous sections 4, an alternative solution for providing a continuity of the magnetic shield 4 is to position bases 5 and covers 6 of the contiguous sections 4 end to end and to weld them. A further alternative solution is to use straight joining members of ferromagnetic material (preferably the same of base 5 and cover 6), again comprising a base and a cover member like the joining member 8, and suitable to be superimposed to each section 4 to be connected for a length preferably comprised between 10 and 300 mm. A still further possible solution is to provide the ends of contiguous sections with transversal flanges and to couple them for example by clips.

It can also be appreciated that the disclosed clips are only a possible example of coupling means suitable to perform elastic coupling with material interpenetration. More generally, coupling means 7 may comprise any resilient member able to pierce the conduit material (in particular steel) under its elastic action, preferably a resilient member provided with a sharp protrusion like the teeth 7c. Commercial fastener means may also advantageously be used, such as self-tapping screws or bolts provided with lock tooth washers and/or nuts (such as kep nuts).

EXAMPLE 1

The Applicant has measured the magnetic field generated above ground by a buried electrical line as previously described, in several different operating conditions.

The test line comprised an electrical current generator, three cables 3 in a trefoil configuration connected to the generator, a cylindrical steel conduit of 50 m length containing the cables 3 from the exit of the generator, and six longitudinal sections 4 containing the cables from the end of the cylindrical conduit. At the exit of the six sections 4, the cables 3 were short-circuited. The longitudinal sections 4 were superimposed for 200 mm and placed 1.4 m underground. The magnetic field was measured by means of a magnetometer model PLM-100WB Handheld ELF produced by MACINTYRE ELECTRONIC DESIGN ASSOCIATES, INC. (485 Spring Park Place, Hemdon, Va. 20170), in a point that is 1 m above ground and between the third and the forth section (i.e. in the middle of the line).

The dimensions of base member 5 were the following:

height: 215 mm;

width: 370 mm;

length: 3000 mm;

slope of lateral walls 5b: 8°;

width of base wall 5a: 230 mm;

width of flanges 5c: 40 mm; thickness: 5 mm.

Cover member 6 was a 5 mm-thick flat panel of 370 mm×3200 mm. Both base 5 and cover 6 were made of steel Q.

Cables 3 were of the type suitable for a 132 kV line, with a diameter of 105 mm. The cables 3 were fed with a 400 A rms at 50 Hz, balanced and symmetrical, three-phase current.

The magnetic field was measured under the following different conditions:

a) cables 3 directly buried (no shielding conduit);
b) cables 3 inside conduit 2 and cover 6 pressed onto base 5 with a force of 60 Kg/m²;
c) cable 3 inside conduit 2 and cover 6 coupled to base 5 by means of clips 7 every 50 cm;
d) cable 3 inside conduit 2 and cover 6 coupled to base 5 by means of clips 7 every 25 cm;

Clips 7 were model H-CADDY® produced by ERICO Inc., 34600 Solon Road Solon, Ohio 44139 United States.

Table 2 reports the maximum magnetic field measured in the above-listed conditions.

TABLE 2

| Condition | Maximum magnetic field [microT] |
|---|---|
| a) | 1.8 |
| b) | 0.15 |
| c) | 0.10 |
| d) | 0.08 |

It can be appreciated that, while a conduit wherein the cover 6 is simply pressed onto the base 5 (but not coupled therewith) can reduce the above-ground magnetic field of a factor greater than 10 with respect to directly-buried cables, a further 33% reduction can be obtained by coupling base 5 and cover 6 with clips 7 spaced of 50 cm. Still another 20% improvement can be obtained by reducing the clips spacing to 25 cm. In practice, by passing from condition a) to condition d), the magnetic field decreases approximately of a factor 22.

EXAMPLE 2

The Applicant has also determined how the magnetic field varies when the measuring position is changed along a transversal direction (i.e. perpendicular to the conduit direction), at 1 m above ground. Shape, dimensions and material of conduit 2 were as in Example 1, and the following coupling conditions were considered:

a) no coupling and perfect isolation between base 5 and cover 6, achieved by interposing a nylon sheet between base 5 and cover 6;
b) coupling by clips 7 every 50 cm;
c) coupling by clips 7 every 25 cm.

Figure 6:
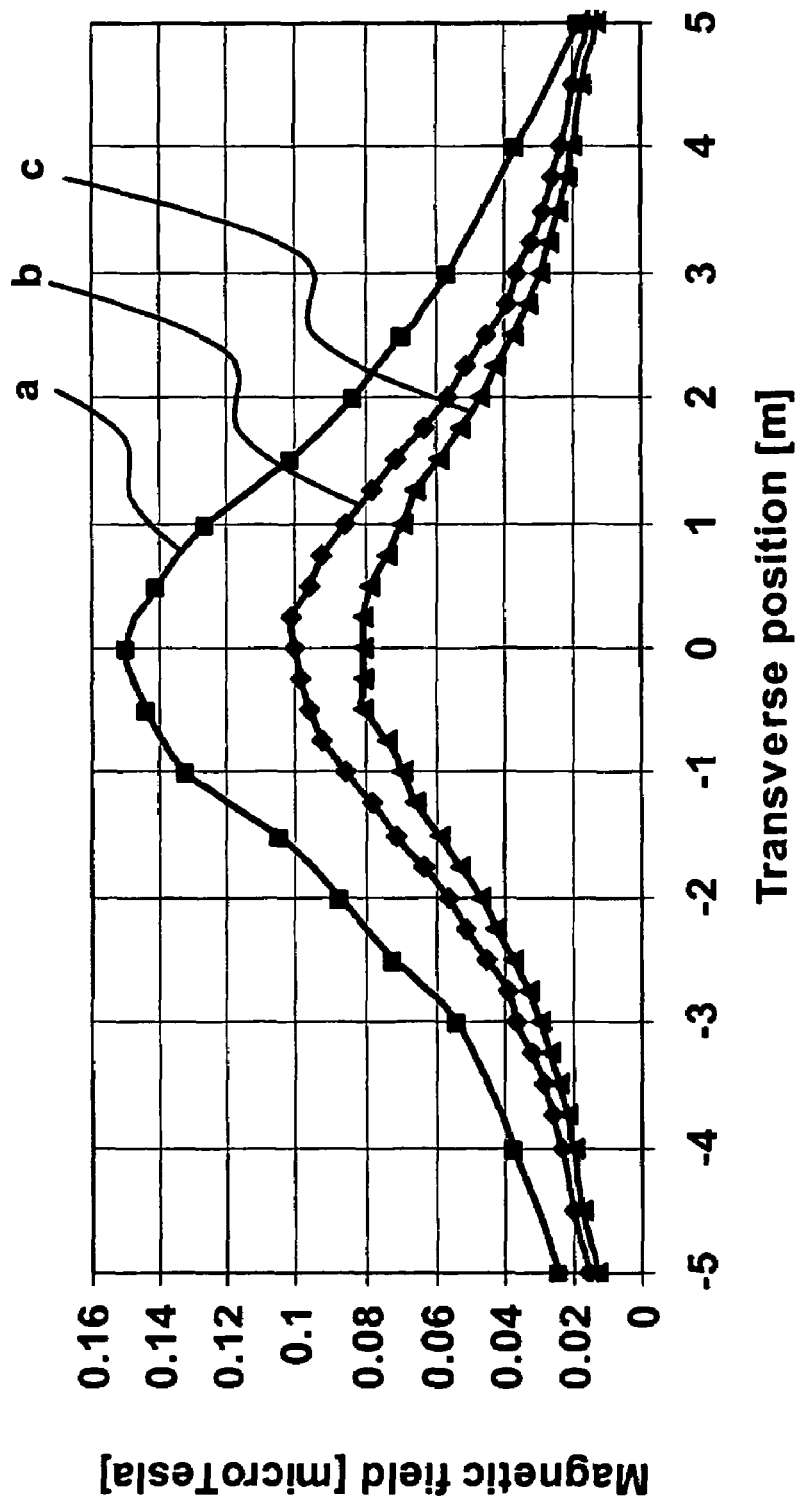
FIG. 6 shows the results of experimental tests.

FIG. 6 shows the results of this experiment. It can be noticed that the curves have a bell-like shape, with the maximum at the point of zero abscissa, i.e. in the median plane of the conduit 2. It can also be appreciated that the percentage improvement obtainable by using clips 7 is substantially constant by moving away from the electrical line 1.

EXAMPLE 3

The Applicant has performed a new set of measures to compare, by means of an "ad hoc" parameter, the effectiveness of different shielding solutions. Such parameter, herein called "electrical continuity" and identified by the symbol λ, is so expressed:

$$\lambda = 100 \cdot \frac{B_n - B_i}{B_n}$$

wherein $B_n$ is the maximum magnetic field measured 1 m above ground (by means of the same instrument of the first example) under total electrical isolation between base 5 and cover 6, achieved by interposing a nylon sheet between base 5 and cover 6, and $B_i$ is the maximum magnetic field measured 1 m above ground under the particular operating conditions. Parameter λ is independent on the measuring distance and it is therefore an absolute index of the increase of the electrical continuity with respect to the perfect isolation condition. Parameter λ is however dependent on the characteristics of the conduit material, in particular on the magnetic permeability.

Parameter λ has been measured in the following conditions, by using two types of conduits having the same shape and dimensions as in Example 1 but made of two different steels, namely steel Q and steel B:

a) cover 6 leaned onto base 5 with the interposition of an insulating nylon sheet;
b) cover 6 leaned onto base 5 (no sheet interposed);
c) cover 6 leaned and pressed onto base 5 (60 Kg/m²);
d) base 5 and cover 6 coupled by bolts every 50 cm;
e) base 5 and cover 6 coupled by bolts every 25 cm;
f) base 5 and cover 6 coupled by clips 7 every 50 cm;
g) base 5 and cover 6 coupled by clips 7 every 25 cm;
h) base 5 and cover 6 coupled by continuous soldering.

Table 3 reports the results of these measurements.

TABLE 3

| Condition | Steel Q | Steel B |
|---|---|---|
| a) | λ = 0% | λ = 0% |
| b) | λ = 3% | λ = 0% |
| c) | λ = 7% | λ = 0% |
| d) | λ = 13% | λ = 1% |
| e) | λ = 20% | λ = 2% |
| f) | λ = 33% | λ = 4% |
| g) | λ = 47% | λ = 5% |
| h) | λ = 82% | λ = 10% |

From the results of Table 3 it can be appreciated that:
coupling by means of clips 7, i.e. elastic coupling with material interpenetration, offer a better electrical continuity than bolt coupling;
a conduit made of a material with higher maximum magnetic permeability (steel Q) provides a higher magnetic shielding.

EXAMPLE 4

Further measures have been performed to verify the influence of superposition between contiguous sections 4 on the measured magnetic field. Shape, dimensions and material of conduit 2 were as in Example 1, and clips 7 were applied every 50 cm to couple base 5 and cover 6. The relative distance between contiguous sections 4 was varied as follows:

a) superposition of 200 mm;
b) end-to-end contact (no longitudinal shift between base and cover);
c) contiguous sections spaced of 200 mm (no longitudinal shift between base and cover).

The magnetic fields, measured as in example 1, are reported in Table 4.

TABLE 4

| Condition | Maximum magnetic field [microT] |
|---|---|
| a) | 0.10 |
| b) | 0.25 |
| c) | 0.40 |

These results show that superposition between contiguous sections is important to provide continuity to the magnetic shield.

EXAMPLE 5

The Applicant has also compared the performances, in terms of electrical connection, of clips 7 with respect to conventional bolts.

Two flat sheets of steel Q, having a thickness of 5.8 mm, have been superimposed with the interposition of an insulating sheet of nylon and electrically connected. The steel sheets were commercial sheets, in conventional storage conditions.

Electrical connection was obtained first with one clip of the above-described type (model H-CADDY® produced by ERICO Inc.), applied without surface preparation, and then with a commercial M4 bolt (tightened by wrench), equipped with flat washers between the bolt head and the upper sheet and the nut and the bottom sheet. In a first test, the surfaces of the sheet to be contacted by the washers were left with no preparation; in a second test, said surfaces were cleaned with sand papers. The resistance between the two slabs was measured with the four-contact technique, by using a DC generator and a milli-voltmeter.

The detected resistance was of 2.3 mΩ in the case of the clip and of 4.2 mΩ in the case of the bolt with cleaned surfaces.

The presence of dirt and corrosion at the bolt contact areas increased the measured resistance of about two times.

What is claimed is:

1. An electrical power transmission line, comprising:
   at least one electrical cable;
   a conduit of ferromagnetic material enclosing said at least one cable and comprising a base and a cover; and
   electrical contact elements electrically connecting said base and said cover, wherein said electrical contact elements are selected from the group of metal fusion joints and resilient members suitable to penetrate said ferromagnetic material.

2. The electrical power transmission line of claim 1, wherein said base and said cover have superimposed portions on both sides of said conduit, and wherein said electrical contact elements are applied to said superimposed portions.

3. The electrical power transmission line of claim 2, wherein said superimposed portions are separated by an air gap and said superimposed portions have a width that is at least five times greater than the thickness of said air gap.

4. The electrical power transmission line of claim 3, wherein said air gap is at most 3% of the perimeter of the cross section of said conduit.

5. The electrical power transmission line of claim 2 wherein a material having a magnetic permeability greater than air is positioned between said superimposed portions of said base and said cover.

6. The electrical power transmission line of claim 1 wherein said resilient members are clips provided with portions able to penetrate said ferromagnetic material.

7. The electrical power transmission line of claim 1 wherein the electrical contact elements have a reciprocal longitudinal distance of at most 50 cm.

8. The electrical power transmission line of claim 7 wherein said reciprocal longitudinal distance is at most 25 cm.

9. The electrical power transmission line of claim 1 wherein the conduit comprises a plurality of longitudinal sections partially superimposed on each other and each comprising a base portion and a cover portion.

10. The electrical power transmission line of claim 9, wherein said longitudinal sections are electrically coupled to each other.

11. The electrical power transmission line of claim 9 wherein the cover portion and the base portion of each of said longitudinal sections are longitudinally shifted from each other.

12. The electrical power transmission line of claim 9, wherein said longitudinal sections are superimposed of a length that is at least 25% of the width of said conduit.

13. The electrical power transmission line of claim 9 wherein at least two of said longitudinal sections extend along different directions, wherein said conduit comprises a joining member for joining said two conduit sections, and wherein said joining member consists of two parts electrically connected by means of said electrical contact elements.

14. The electrical power transmission line of claim 9 wherein said base portion has a "U"-shaped cross-section.

15. The electrical power transmission line of claim 1, wherein said ferromagnetic material is steel.

16. The electrical power transmission line of claim 1 wherein said at least one cable comprises three cables arranged in a trefoil configuration.

17. The electrical power transmission line of claim 1 wherein said cover portion is substantially flat.

18. The electrical power transmission line of claim 1 wherein the conduit is placed underground.

19. A method for screening the magnetic field generated by an electrical power transmission line comprising at least one electrical cable, said method comprising the steps of:
   placing said electrical cable in a conduit of ferromagnetic material comprising a base and a cover;
   coupling said base and said cover with an electrical contact element that penetrates said ferromagnetic material; and
   providing an electrical connection between said base and said cover having a conductance, per meter of length, of at least 150 Siemens/m.

20. The method of claim 19, wherein said conductance is at least 500 Siemens/m.

21. The method of claim 20, wherein said conductance is at least 1500 Siemens/m.

22. The method of claim 19, wherein said base and said cover are elastically coupled.

23. The electrical power transmission line of claim 1 wherein said resilient members are suitable to penetrate said ferromagnetic material without forming through-holes in said base or said cover.

24. The method of claim 19, wherein placing said electrical cable in a conduit comprises superimposing respective lateral portions of said base and said cover, and wherein providing an electrical connection between said base and said cover comprises electrically coupling said lateral portions.

25. The method of claim 24, wherein electrically coupling said lateral portions comprises applying to said lateral portions a plurality of metal resilient clips able to pierce the surface of said lateral portions under their elastic action.

26. The method of claim 19, wherein placing said electrical cable in a conduit comprises arranging the base underground, laying down said at least one cable into said base, and leaning the cover onto said base so as to substantially close said conduit.

27. The method of claim 19, wherein the conduit comprises a plurality of longitudinal sections and the method comprises electrically coupling said longitudinal sections to each other.

28. The method of claim 19, wherein said ferromagnetic material of said conduit comprises a first ferromagnetic material for said base and a second ferromagnetic material for said cover.

29. The method of claim 19, wherein said electrical contact element interpenetrates said first ferromagnetic material of said base and said second ferromagnetic material of said cover without forming through-holes in said base or said cover.

30. A method for screening the magnetic field generated by an electrical power transmission line comprising at least one electrical cable, said method comprising the steps of
placing said electrical cable in a conduit of ferromagnetic material comprising a base and a cover; and
providing an electrical connection between said base and said cover having a conductance, per meter of length, of at least 150 Siemens/m by realizing a metal fusion between said base and said cover.

31. An electrical power transmission line, comprising:
at least one electrical cable;
a conduit of ferromagnetic material enclosing said at least one cable and comprising a base and a cover, said ferromagnetic material having a maximum relative magnetic permeability greater than 1,000; and
electrical contact elements electrically connecting said base and said cover, wherein said electrical contact elements are selected from the group of metal fusion joints and resilient members suitable to penetrate said ferromagnetic material.

* * * * *